May 30, 1950
R. A. LEACH
2,509,466
WHEEL ALIGNMENT INSTRUMENT
Filed May 22, 1947
2 Sheets-Sheet 1
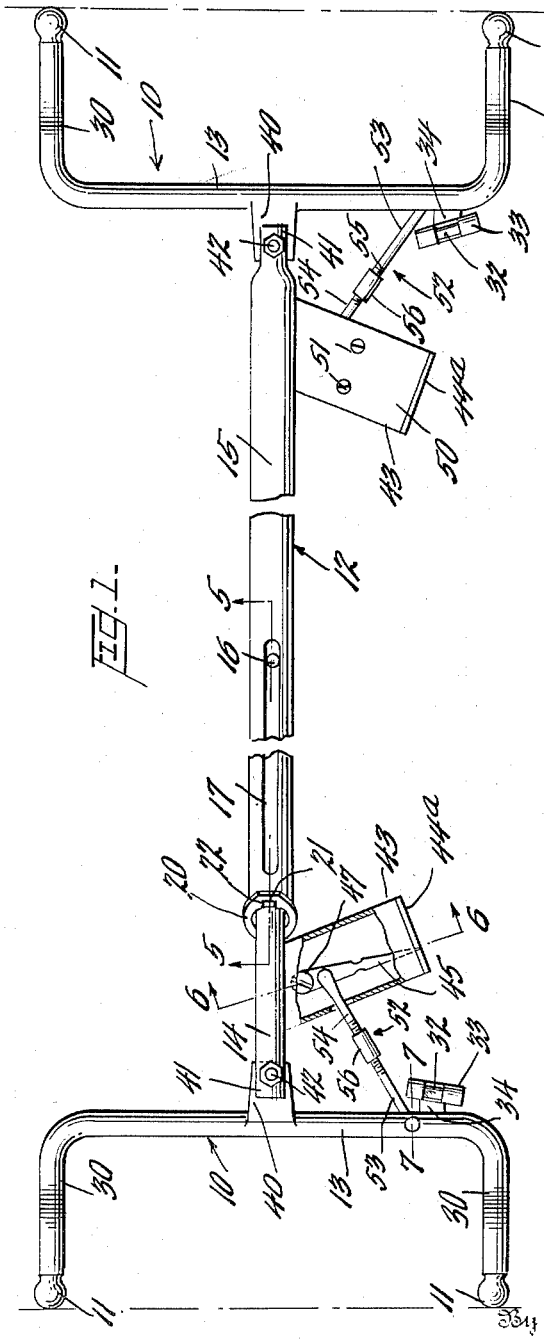
Inventor
Raymond A. Leach,
J. R. Paris  Attorney May 30, 1950  R. A. LEACH  2,509,466
WHEEL ALIGNMENT INSTRUMENT
Filed May 22, 1947  2 Sheets-Sheet 2
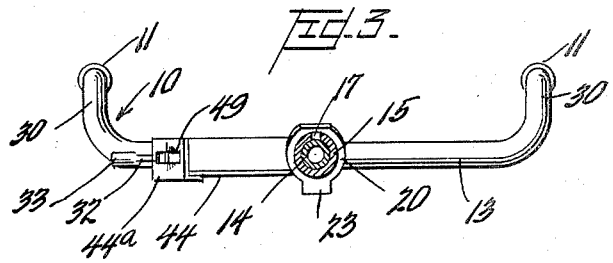
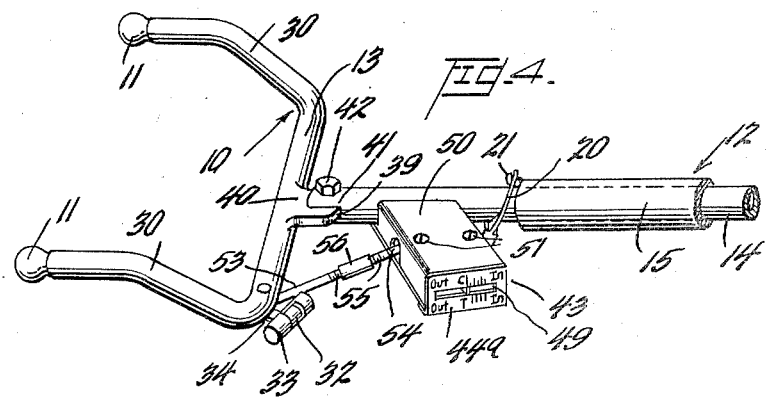
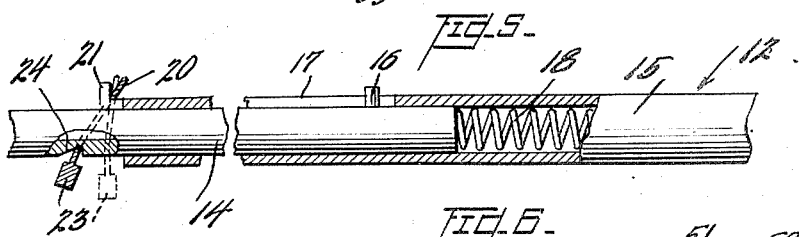
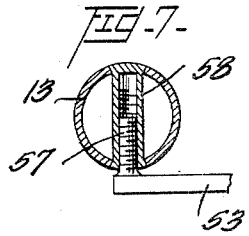
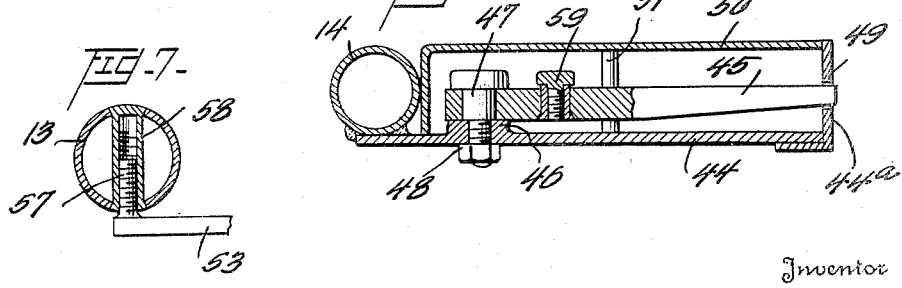
Inventor
Raymond A. Leach,
By I. R. Paris
Attorney Patented May 30, 1950

2,509,466

UNITED STATES PATENT OFFICE 2,509,466

WHEEL ALIGNMENT INSTRUMENT

Raymond A. Leach, Everett, Pa.

Application May 22, 1947, Serial No. 749,815

5 Claims. (Cl. 33—203.2)

The present invention aims to provide a wheel alignment gauge, which may be manipulated with great facility, is accurate, and may be employed on all types of modern cars and trucks to assist in the proper alignment of the wheels and simultaneously center the steering.

More particularly the present invention provides an apparatus which may be inserted between the front wheels of an automobile or truck, be retained in position between the wheels while the desired adjustment of the wheels to proper alignment is being made, the gauge providing an indication of the degree of misalignment at the beginning of the operation and of the progress of the correction to show when the wheels are in proper alignment.

For this purpose the present gauge comprises a pair of telescoping tubes with an interior spring so that the ends of the gauge are spring pressed and spring held in position between the wheels during the adjustment operation.

Another object of the invention is to facilitate the manipulation of the gauge in the space between the wheels. For this purpose the present invention comprises a latch which holds the gauge in a shortened condition against the compressed spring, the latch acting both to latch and unlatch the gauge without direct manipulation.

Another phase of the present invention resides in providing the gauge with spherical contact elements which fit into and engage the bottom of the annular groove of the felly band of the wheel rim which provides an accurate seat for the ends of the gauge.

As another object of the invention and to facilitate the accurate adjustment of the toe-in of the front wheels the gauge is provided with a spirit level at each end so that when in use the gauge may be maintained in a horizontal position.

Other objects and advantages of the present invention will be apparent to persons skilled in the art from the following specification and the accompanying drawings, which illustrate one embodiment of the present invention; it being understood that variations therefrom falling within the scope of the appended claims will suggest themselves to those skilled in the art.

In the drawings:

Fig. 1 is a plan view of the gauge,

Fig. 2 is a front view,

Fig. 3 is a sectional view on line 3—3 of Fig. 2,

Fig. 4 is a perspective view of one end of the gauge,

Fig. 5 is a fragmentary sectional view of the telescoping tubes,

Fig. 6 is a sectional view on line 6—6 of Fig. 1, and

Fig. 7 is a fragmentary section on line 7—7 of Fig. 1.

While it may be made of any suitable material, the present gauge is largely composed of stock tubular steel material. The gauge comprises a pair of U-shaped or forked tubular end members 10 carrying the steel contact balls 11 at their ends and a tubular extensible cross member 12 connecting the midpoints of the base portions 13 of the end of forks 10.

The extensible cross member 12 comprises a pair of telescoping tubes, 14 and 15. The smaller or inner tube 14 has a pin 16, which is disposed within the elongated slot 17 in the larger tube 15. This serves to limit the relative longitudinal movement of the two tubes and, by reason of the snug fit of the pin 16 against the sides of the slot 17, this also serves to prevent any relative rotation of the tubes 14 and 15.

A helical spring 18 is disposed within the larger tube 15. The spring 18 presses against the end of the smaller tube 14. In order to facilitate the manipulation of the gauge and to enhance its accuracy, the cross member 12 is provided with a latch which can lock and hold the gauge in its shortened condition against the pressure of the spring 18. The latch consists of an annulus 20 held in more or less freely suspended position by the upturned lug 21 at the end of the tube 15. The opening in the annulus 20 is oval in shape and embraces the tube 14 loosely and freely. The annulus has an interior notch 22 which fits over the lug 21 freely. The engagement between the annulus latch 20 and the lug 21 is such that while the latch is captured by the lug 21 it has a more or less free swinging movement. At a point opposed to the notch 22 and lug 21 the annulus has an integral weighted portion 23. The underside of the tube 14 has a notch 24, which receives the inner edge of the latch 20 to hold the gauge in its compressed and shortened condition against the pressure of the spring.

Referring again to the end forks 10 of the gauge, it will be seen that the arms 30 of the U-shaped end members 10 are bent or curved as shown in Figs. 2 and 4. This permits the gauge to be disposed well below the understructure of the vehicle while the contact balls 11 rest freely in the grooved portion of the felly 31 of the wheels.

In manufacture the solid steel balls 11 are selected for size to fit into the bottom of the groove of the felly of the wheel so as to minimize any free play of the ball in the groove. The balls 11 are brazed onto the open ends of the tubular stock of the arms 30 and the units 10 are adjusted so that the balls 11 lie in a horizontal plane as indicated by the spirit level 32 carried by the metallic casing 33 firmly affixed to and rendered integral with the end unit 10 by the attachment or securement 34.

Thus the end forks 10 are rigid, rugged, integral units, which can take the rough treatment of a work shop and their trueness remains preserved.

The mid point of the base portion 13 of each unit 10 is provided with a flattened area 40, which may be obtained by welding on a flat element or by flattening or collapsing the tubular stock. The flattened area 40 is received in the bifurcated end 41 of the tube 14 or 15, as the case may be, and is pivotally held there by the bolt or pivot pin 42.

The cross member 12 carries an indicator 43 at each end designed to indicate the alignment of the adjacent wheel. This indicator comprises essentially the base plate 44, which is welded onto the cross member as to the tube 14 as shown in Fig. 6, and the pointer 45 mounted on the plate 44 to have substantial angular movement. The rear end of the pointer 45 rests on the stud 46, integral with plate 45, and receives the pivot pin or bolt 47 which is held firmly in position by nut 48. The pin 47 provides a pivot bearing for the pointer 45.

The angled end member 44a is secured to plate 44 and has slot 49 which receives the end of the pointer 45. The outer face of the member 44a has scale indicia over and under the slot 49, one set for passenger vehicles and the other for trucks. A cover 50 secured by screws 51 encases the pointer 45.

The two indicators 43 are so mounted, as shown, that the indicator faces are inclined to each other and both can be read from a single position.

The rod 52 transmits motion from the end 10 to the pointer 45. The present rod 52 is so constructed and so connected to the end 10 and pointer that there is no lost motion between the end and the pointer thereby providing an accurate indication of the alignment or toe-in of each wheel. For this purpose the connection between the ends of the rods 52 and the end member 10 at one end and the pointer 45 at the other end are screw threaded connections. These ends of the rod 52 have a minute rotary movement. The screw threaded connections eliminate all lost motion, and the pointers give precise indications of the alignment of the wheels.

In order to facilitate the assembly of the connecting rod 52 with the end 10 and pointer 45, the rod is made of two parts 53 and 54 which have threads 55 at their ends connected by the interiorly threaded sleeve 56.

The threads 55 are both right hand screw threads and any movement of sleeve 56 will not alter the setting. The opposite end of the rod 53 has a screw threaded pin 57 which engages internal threads in the walls of the tube 10 or of an interiorly threaded sleeve 58 which is disposed transversely of the tube 10 and welded thereto. Similarly one end of rod 54 has a threaded pin 59 which enters the interior thread in pointer 45. Thus by means of the threaded pins at the end of the connecting rod movement of end 10 is transmitted accurately to the pointer 45.

The outer edge 39 of the flattened portion 40 engages the bottom of the slot on one side or the other at the extreme of the pivotal movement of the fork 10 relative to the cross member 12. This imposes relatively narrow limits of pivotal movement upon the end forks 10. These limits are such that the free end of the corresponding pointer 45 never engages the ends of the slot 49. In the present apparatus the maximum movement of the end fork 10 is less than five degrees, and the maximum movement of the pointer 45 is about ten degrees.

In order to obtain an accurate indication of the toe-in it is necessary that aside from the movements of the fork 10 and the movement of the pointer 45, which movements are essential, other movements should be reduced to a minimum or entirely eliminated.

In the present construction this end is partly had by limiting the movements of 10 and 45 as described in the preceding paragraph. In addition the angles and dimensions established by the connecting rod between the fork 10 and the pointer 45 are such that the rotation of the pins 57 and 59 are so slight that they cannot be observed by the naked eye. For this purpose the connecting rod is so positioned that the amount of rotation of the pins 57 and 59 are about equal. For this purpose the pin 57 is located a distance from pivot point 42 which is several fold the distance of pin 59 from pivot point 47. Roughly the relationship of these distances is inversely to the relationship of the angles of maximum travel of the fork and pointer respectively.

Thus by minimizing the rotation of the pins 57 and 58 and by rendering them about equal and by the employment of screw thread engagements at these points the indicators are accurate and maintain their accuracy throughout the life of the apparatus.

In its normal or inactive condition the gauge is in its compressed condition with the latch 20 in engagement with the notch 24. In this shortened condition the gauge is considerably shorter than the distance between the wheels of a vehicle. When it is desired to test and adjust the toe-in of the front wheels of an automobile, the operator grips the portions 13 and, after disposing the gauge between the wheels, presses the ends toward each other. This pressure forces the lug 21 and the upper end of the latch 20 to a position overlying the notch 24. The weight 23 then causes the disengagement of the latch from the notch. By the subsequent release of manual pressure the spring 18 extends the gauge and the contact balls 11 are caused to be positioned in the felly grooves 31. A bit of rocking of the gauge and the grooves are cleared from any obstructions and the contact balls sit snugly in the grooves. The gauge is permitted to remain in position until the adjustment is completed.

Before any adjustments are made the steering wheel is turned to its center line or to its normal driving position so that the indication given by each indicator will be true for its wheel. After the steering wheel is set, the gauge is set in horizontal position as indicated by the levels 32. The indicators or pointers 45 then show the amount of toe-in or toe-out of each wheel.

In cars which have two tie rods, steering centering is required. By means of the present invention this is obtained simultaneously with the adjustment of the toe-in. With the steering wheel set on its center line, each tie rod is turned until its pointer 45 shows the desired toe-in for the wheel. At the completion of this operation the wheels are adjusted and steering is properly centered.

When there is only a single tie rod steering centering is not involved. The wheel alignment may be adjusted at either end of the tie rod or at either wheel. Only one indicator needs to be read after the other has been set and maintained on the zero position. When the adjustment is completed the forks 10 are pressed manually so as to release them from the wheels. When the gauge is removed from under the car the forks 10 are again pressed to compress the spring 18 until pin 16 engages the end of the slot 17. By turning the gauge the latch 20 engages the notch 24 upon release of manual pressure, and the pin 16 takes the position slightly spaced from the end of the slot to provide space for the slight compression necessary for the release of the latch.

Thus the present gauge provides a rugged and accurate wheel alignment gauge, which may be employed with great facility and will give accurate and reliable results.

I claim:

1. A wheel alignment gauge comprising a pair of rigid U-shaped end members, a ball rigidly affixed to the free ends of said members for entry into a felly groove, a cross connector between said end members pivotally connected to the midpoint of said end members for limited relative movement therebetween, an indicator carried by said connector adjacent each member, said indicator having a fixed dial and a movable pointer, and a rigid connecting rod between each end member and said pointer, said connecting rod having integral threaded end portions, said end members and pointers each having interiorly threaded portions receiving said threaded end portions.

2. A wheel alignment gauge comprising a pair of rigid U-shaped end members, a ball rigidly affixed to the free ends of said members for entry into a felly groove, a cross connector between said end members pivotally connected to the midpoint of said end members for limited relative movement therebetween, an indicator carried by said connector adjacent each member, said indicator having a fixed dial and a movable pointer, and a rigid connecting rod between each end member and said pointer, said connecting rod having integral threaded end portions, said end members and pointers each having interiorly threaded portions receiving said threaded end portions, the connecting rod being disposed between the end member and pointer to minimize and to equalize rotary movement of its threaded engagements.

3. A wheel alignment gauge comprising a pair of rigid U-shaped end members, a ball rigidly affixed to the free ends of said end members for entry into a felly groove, a cross connector pivotally connected to said end members for limited relative pivotal movement, said cross member comprising a pair of telescoping parts, a helical spring disposed within one of said parts and pressing against the other, interengaging means between said parts providing for limited, relative, longitudinal movement of said parts, said interengaging means constraining said parts against relative rotation, a gravity operated latch to hold said parts in compressed condition against the force of said spring, a dial plate rigidly carried by said connector at each end, a pointer pivotally mounted on said plate, and a connecting rod connected to each pointer and adjacent end member.

4. A wheel alignment gauge comprising a pair of rigid U-shaped end members, a ball rigidly affixed to the free ends of said end members for entry into a felly groove, the base of each end member having a flat portion at its midpoint, a cross connector pivotally connected to said flat portions for limited relative pivotal movement, said cross member comprising a pair of telescoping parts, a helical spring disposed within one of said parts and pressing against the other, interengaging means between said parts providing for relative movement of said parts, a gravity operated latch to hold said parts in compressed condition against the force of said spring, a plate rigidly carried by said connector at each end, a dial carried by said plate at its front end, said dials being inclined toward each other, a pointer pivotally mounted on said plate, and a rigid connecting rod connected to each pointer and adjacent end member, the connecting rod having integral threaded end portions, said end members and pointers each having interiorly threaded portions receiving said threaded end portions.

5. A wheel alignment gauge comprising a pair of rigid U-shaped end members, each having substantially spherical free ends for entry into a felly groove, a cross connector between said end members pivotally connected to the midpoint of said end members for limited relative movement therebetween, an indicator carried by said connector adjacent each member, said indicator having a fixed dial and a movable pointer, and a rigid connecting rod between each end member and said pointer, said connecting rod having integral threaded end portions, said end members and pointers each having interiorly threaded portions receiving said threaded end portions.

RAYMOND A. LEACH.

REFERENCES CITED

The following references are of record in the file of this patent:

UNITED STATES PATENTS

| Number | Name | Date |
| --- | --- | --- |
| 1,206,476 | Snyder | Nov. 28, 1916 |
| 1,269,336 | Taylor | June 11, 1918 |
| 1,324,388 | Duby | Dec. 9, 1919 |
| 1,544,980 | Hartsock | July 7, 1925 |
| 1,777,686 | Bagge | Oct. 7, 1930 |
| 1,853,517 | Finnerty | Apr. 12, 1932 |
| 1,894,370 | Erickson | Jan. 17, 1933 |
| 2,164,853 | Beckwith | July 4, 1939 |
| 2,229,352 | Thannhauser | Jan. 21, 1941 |